(12) United States Patent
Jackowski et al.

(10) Patent No.: US 9,890,739 B2
(45) Date of Patent: Feb. 13, 2018

(54) CONTROLLING NOZZLE AREAS OF VARIABLE AREA FAN NOZZLES

(71) Applicant: The Boeing Company, Chicago, IL (US)

(72) Inventors: Jason Joseph Jackowski, Everett, WA (US); Matthew A. Carpenter, Seattle, WA (US); Kent Edmund Karnofski, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 14/665,627

(22) Filed: Mar. 23, 2015

(65) Prior Publication Data

US 2016/0281639 A1     Sep. 29, 2016

(51) Int. Cl.
*F02K 1/18* (2006.01)
*F02K 1/12* (2006.01)
(Continued)

(52) U.S. Cl.
CPC .............. *F02K 1/18* (2013.01); *F02K 1/12* (2013.01); *F02K 1/1207* (2013.01); *F02K 1/15* (2013.01);
(Continued)

(58) Field of Classification Search
CPC . F02K 1/12; F02K 1/1207; F02K 1/15; F02K 1/18; F05D 2270/821
See application file for complete search history.

(56) References Cited

U.S. PATENT DOCUMENTS

| 2,634,578 A | 4/1953 | Kallal |
| 5,295,645 A * | 3/1994 | Rozmus ............... F02K 1/1207 239/265.39 |

(Continued)

FOREIGN PATENT DOCUMENTS

| EP | 2568150 | 3/2013 |
| WO | 2008045034 A1 | 4/2008 |
| WO | 2008045092 A1 | 4/2008 |

OTHER PUBLICATIONS

Moir, Ian; Aircraft Systems: Mechanical, Electrical and Avionics Subsystems Integration; May 5, 2008; Wiley; 3$^{rd}$ edition; Section 4.3: Hydraulic Actuation.*

(Continued)

*Primary Examiner* — Pascal M Bui Pho
*Assistant Examiner* — Kyle Thomas
(74) *Attorney, Agent, or Firm* — Kwan & Olynick LLP

(57) ABSTRACT

Provided are methods and systems for measuring and controlling nozzle areas of variable area fan nozzles. A control system attached to a nozzle may include a cable having one end connected to a linear displacement measuring device, such as a string potentiometer. The other end of the cable may be connected to a petal. A reference portion of the cable extends across multiple petals of the nozzle and, in some embodiments, substantially parallel to the nozzle circumference. The linear displacement measuring device measures any changes in the length of this reference portion as the petals actuate outwardly or inwardly during operation of the nozzle. The output of the linear displacement measuring device may be used to control actuators that move the petals. In some embodiments, potentiometer's output may be combined with one or more outputs from other sensors, such as a linear variable differential transducer and/or thermocouple.

20 Claims, 11 Drawing Sheets

(51) Int. Cl.
*F02K 1/15* (2006.01)
*F02K 3/02* (2006.01)

(52) U.S. Cl.
CPC ........ *F02K 3/025* (2013.01); *F05D 2270/821* (2013.01); *Y02T 50/671* (2013.01); *Y02T 50/677* (2013.01)

(56) References Cited

U.S. PATENT DOCUMENTS

| | | | |
|---|---|---|---|
| 2008/0302907 A1* | 12/2008 | Schafer | F01D 17/02 244/54 |
| 2010/0005778 A1* | 1/2010 | Chaudhry | F02K 1/1207 60/226.3 |
| 2013/0020408 A1* | 1/2013 | Jasklowski | F02K 1/12 239/265.11 |
| 2013/0160425 A1* | 6/2013 | Scanlon | F01D 17/02 60/226.3 |
| 2013/0306755 A1 | 11/2013 | Dittmann et al. | |
| 2014/0117113 A1* | 5/2014 | Bakken | F02K 1/1207 239/265.33 |

OTHER PUBLICATIONS

BEI Sensors; Draw Wire Sensors; Dec. 30, 2013; BEI Sensors; Section: LT25 Linear Cable Transducer.*

Mabe, J., "Variable area jet nozzle for noise reduction using shape memory alloy actuators", J. Acoust. Soc. Am. 123, 3871, Retrieved from the Internet: <http://webistem.com/acoustics2008/acoustics2008/cd1/data/articles/003595.pdf>, 2008, pp. 5487-5492.

"European Application Serial No. 16161346.8, Search Report dated Jul. 22, 2016", 9 pgs.

* cited by examiner

CONTROLLING NOZZLE AREAS OF VARIABLE AREA FAN NOZZLES

TECHNICAL FIELD

This disclosure generally relates to variable area fan nozzles and, more specifically, to controlling nozzle areas of variable area fan nozzles.

BACKGROUND

Bypass turbofan engines may have problems with fan stability. This particular engine produces two exhaust flows. The first flow is an engine core flow, which is discharged from a core flow nozzle after passing through a core engine. The second flow is a fan flow, which passes through an annular passageway formed by a core engine nacelle surrounding the core engine and fan duct. The cross-sectional areas through which these two flows pass (i.e., the engine core flow throat area at the core flow nozzle and the fan flow throat area at the fan nozzle) are optimized for specific operating conditions. However, the operating conditions change. For example, during takeoff, more thrust is needed from the engine than during cruise flight. More thrust is generated by passing more gases through the fan duct at the fan nozzle resulting in the increased velocity of the gas flow. Variable area fan nozzles may be used to address the fan stability. A variable area fan nozzle include movable petals that may be actuated outwardly to enlarge the nozzle area and, as a result, to reduce the exhaust velocity. Conversely, these petals may be actuated inwardly to reduce the nozzle area of the fan nozzle and, as a result, to increase the exhaust velocity. Fan stability issues can arise when the nozzle area is not large enough causing back pressure to be too high. A variable area fan nozzle can increase the nozzle area to alleviate this back pressure and eliminate fan instabilities.

SUMMARY

Provided are methods and systems for controlling nozzle areas of variable area fan nozzles. A nozzle or, more specifically, a control system attached to the nozzle may include a cable with one of its ends connected to a linear displacement measuring device, such as a string potentiometer. The other end of the cable may be connected to one of the petals. A reference portion of the cable extends across the petals forming the nozzle and, in some embodiments, substantially parallel to the nozzle circumference. The linear displacement measuring device measures any changes in the length of this reference portion as the petals may be actuated outwardly or inwardly during operation of the nozzle. The output of the linear displacement measuring device may be used to control actuators that move the petals. In some embodiments, potentiometer's output may be combined with one or more outputs from other sensors, such as a linear variable differential transducer and/or thermocouple.

In some embodiments, a variable area fan nozzle includes a plurality of petals, cable, and linear displacement measuring device. The plurality of petals includes supported petal ends and free petal ends. The supported petal ends are pivotably coupled to a fan duct, while the free ends form at least a portion of the nozzle circumference. The free petal ends can be bent by thrust and aerodynamic forces independent of the actuator inputs. The nozzle circumference is associated with the nozzle area of the variable area fan nozzle. The nozzle area may be sometimes referred to as a flow throat area or, simply, a throat area. The nozzle area is defined as the surface connecting the free petal ends to the primary nozzle resulting in the minimum area. This surface is not necessarily smooth or a geometrically precise outer surface of a conical frustum. If the cable is positioned at the free petal ends, then the cable senses the change in circumference of this surface. However, one having ordinary skills in the art would understand that the cable can be positioned at other locations.

The cable includes a first end and second end. The first end of the cable may be connected to the first petal of the plurality of petals. A reference portion of the cable extends across the plurality of petals. In some embodiments, the reference portion extends substantially parallel to the nozzle circumference. The linear displacement measuring device is connected to the second end of the cable and measures the position of the second end of the cable relative to the attachment point of the linear displacement measuring device, which in turn represents the length of the reference portion of the cable.

In some embodiments, the attachment point of the linear displacement measuring device is a second petal of the plurality of petals. The second petal may be different from the first petal to which the first end of the cable may be connected to. In some embodiments, the first petal and second petal may be separated by one or more additional petals, which are also parts of the plurality of petals. Alternatively, the attachment point of the linear displacement measuring device may be on the fan duct or some other fixed component of the variable area fan nozzle or engine nacelle. In some embodiments, the attachment point of the linear displacement measuring device is closer to the duct than the reference portion of the cable extending across the plurality of petals.

In some embodiments, the reference portion of the cable extends closer to the free petal ends than to the supported petal ends. More specifically, the reference portion of the cable may extend at the free petal ends. In some embodiments, the reference portion of the cable extends over the external surface of the plurality of petals. The cable may include a polymer shell.

The reference portion of the cable may extend with a sleeve attached to at least one of the plurality of petals. More specifically, the reference portion of the cable may extend through multiple sleeves, such that each sleeve is positioned on a different petal of the plurality of petals. In some embodiments, the reference portion of the cable extends within a channel in at least one of the plurality of petals. More specifically, the reference portion of the cable may extent within multiple channels, such that each channel is positioned in a different petal of the plurality of petals.

In some embodiments, the plurality of petals is disposed between a first actuator and second actuator, both actuators being connected to an flex rod. The flex rod may contact each of the plurality of petals and used to pivot the plurality of petals relative to the fan duct thereby changing the nozzle circumference and/or nozzle area. When the first end of the cable is attached to the first petal, this first petal may be the closest to the first actuator among the plurality of the petals. In some embodiments, the attachment point of the linear displacement measuring device is on a second petal, which may be the petal closest to the second actuator among the plurality of the petals. The first actuator may be coupled to a linear variable differential transducer or any other linear feedback device operable for measuring the position of the first actuator. The output of the linear variable differential transducer and the output of the linear displacement measuring device may be collectively used for controlling the nozzle area. More generally, a linear variable differential transducer (or any other angle measurement device) may be used for measuring an angle of one of the plurality of the petals with respect to the fan duct.

Provided also is a method of controlling the nozzle area of a variable area fan nozzle. The method may involve receiving a first input from a linear displacement measuring device connected to a second end of a cable. The first input depends on the position of the second end of the cable relative to the attachment point of the linear displacement measuring device. At the same time, the first end of the cable may be connected to a first petal of a plurality of petals. The plurality of petals includes supported petal ends and free petal ends. The supported petal ends are pivotably coupled to a duct of the variable area fan nozzle. The free ends form at least a portion of the nozzle circumference of the variable area fan nozzle. The nozzle circumference is associated with the nozzle area of the variable area fan nozzle. A reference portion of the cable extends across the plurality of petals. In some embodiments, the reference portion extends substantially parallel to the nozzle circumference of the variable area fan nozzle. The first input depends on the length of the reference portion of the cable that changes as the plurality of petals change their orientation.

The method may proceed with comparing the first input from the linear displacement measuring device to a first reference value. For example, a control system receiving the first input from the potentiometer may include a look-up database with various reference values, each value associated with a different orientation of the plurality of petals. Based on comparing the first input to the first reference value, a first output may be generated for one or more actuators of the variable area fan nozzle.

In some embodiments, the method also involves receiving a second input from another linear feedback device, such as linear variable differential transducer, measuring a position of the one or more actuators. This second input is compared to a second reference value. In this case, the first output is generated based on comparing the first input to the first reference value and based on comparing the second input to the second reference value. Other methods of estimating the nozzle area based on multiple sensor inputs include model-based quadratic estimators, Kalman filters, and empirically derived models. Once the nozzle area is estimated, the controller can continuously command new actuator positions until the desired nozzle area is attained.

In some embodiments, the method also involves adjusting the position of the one or more actuators based on the first output. After adjusting position of the one or more actuators, the method may proceed with receiving a third input from the linear displacement measuring device. In some embodiments, the method may involve adjusting position of the one or more actuators based an external output. In this case, after adjusting position of the one or more actuators, the method proceeds with receiving another input (e.g., a third input) from the linear displacement measuring device. In this case, the third input may be used similar to the first input described above. Specifically, the third input may be compared to its reference and another output may be generated based on this comparison.

In some embodiments, the method involves receiving a fourth input from a thermocouple, which may be thermally coupled to the cable. The method may proceed with comparing this fourth input to a fourth reference value. In this case, the first output is generated based on comparing the first input to the first reference value and comparing the fourth input to the fourth reference value.

BRIEF DESCRIPTION OF THE DRAWINGS

Figure 1:
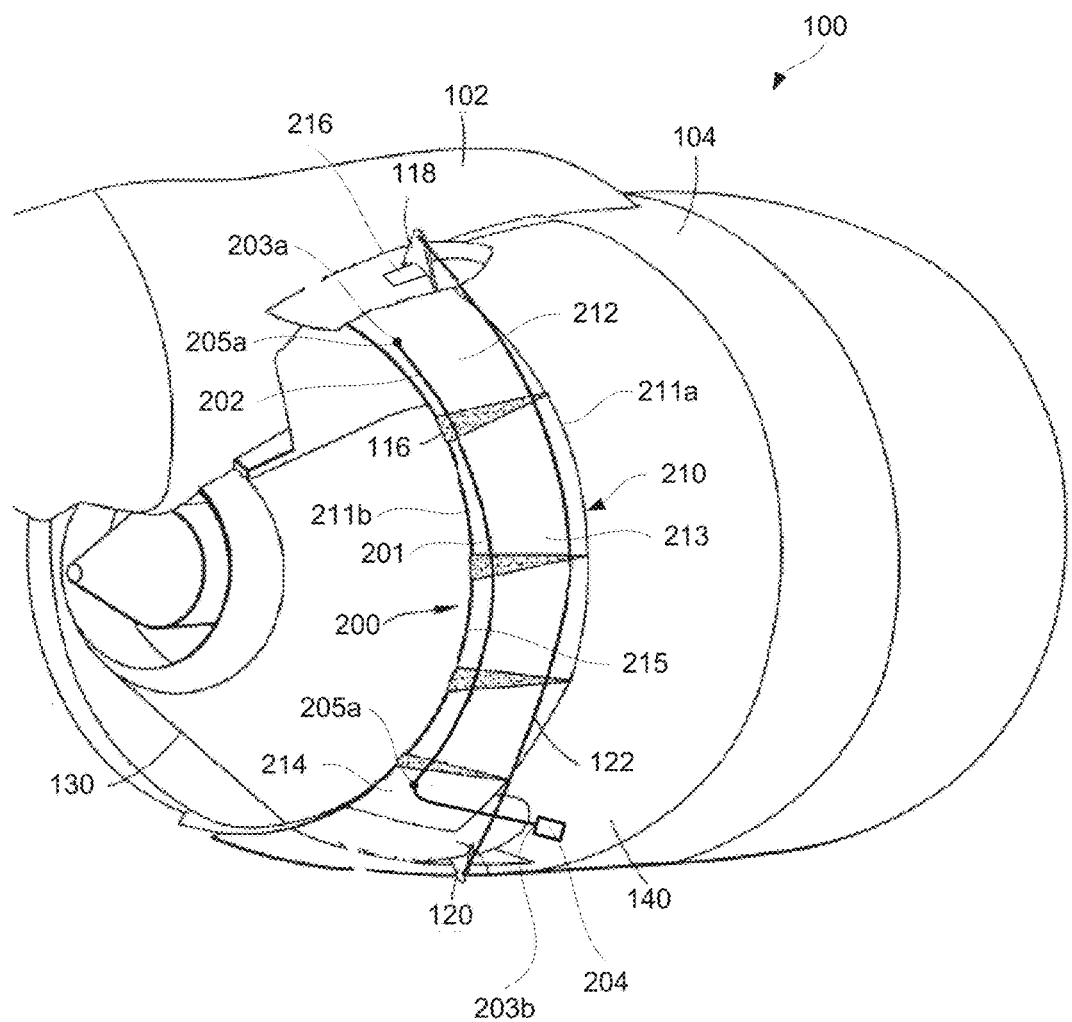

Having thus described examples of the disclosure in general terms, reference will now be made to the accompanying drawings, which are not necessarily drawn to scale, and wherein like reference characters designate the same or similar parts throughout the several views, and wherein:

FIG. 1 is a schematic representation of a turbofan engine including a variable area fan nozzle having a nozzle area control system, in accordance with some embodiments.

Figure 2A:
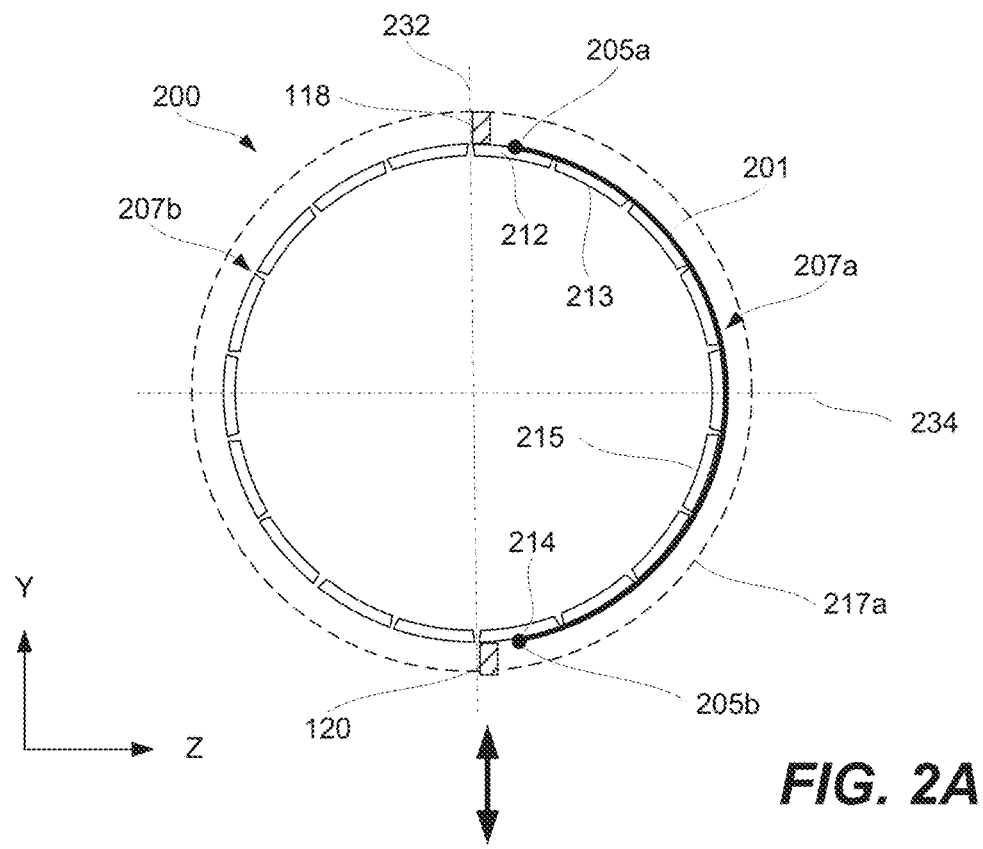
Figure 2B:
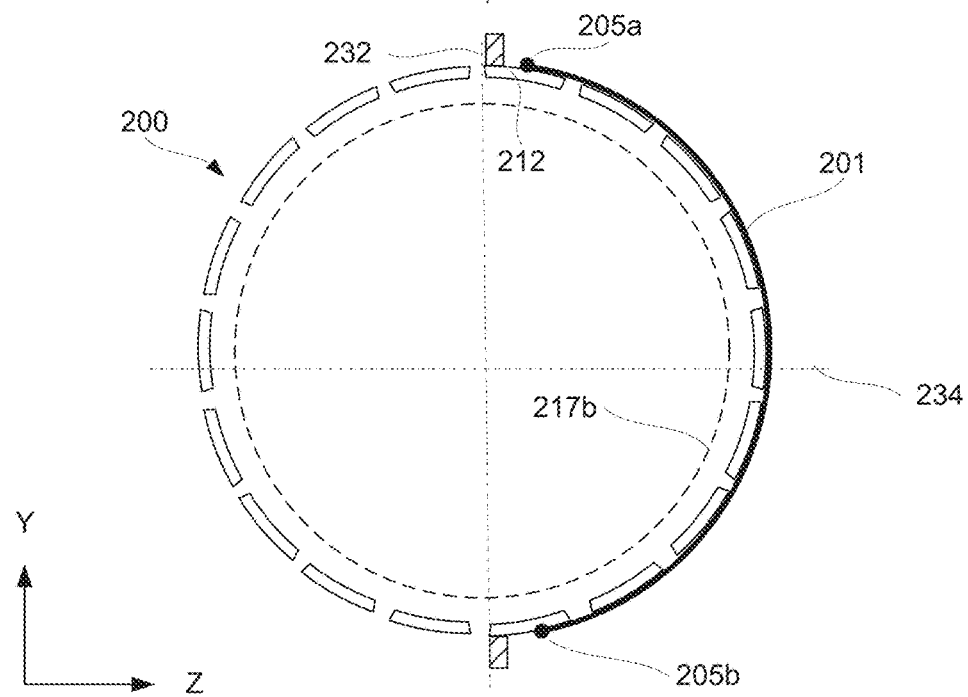
Figure 2C:
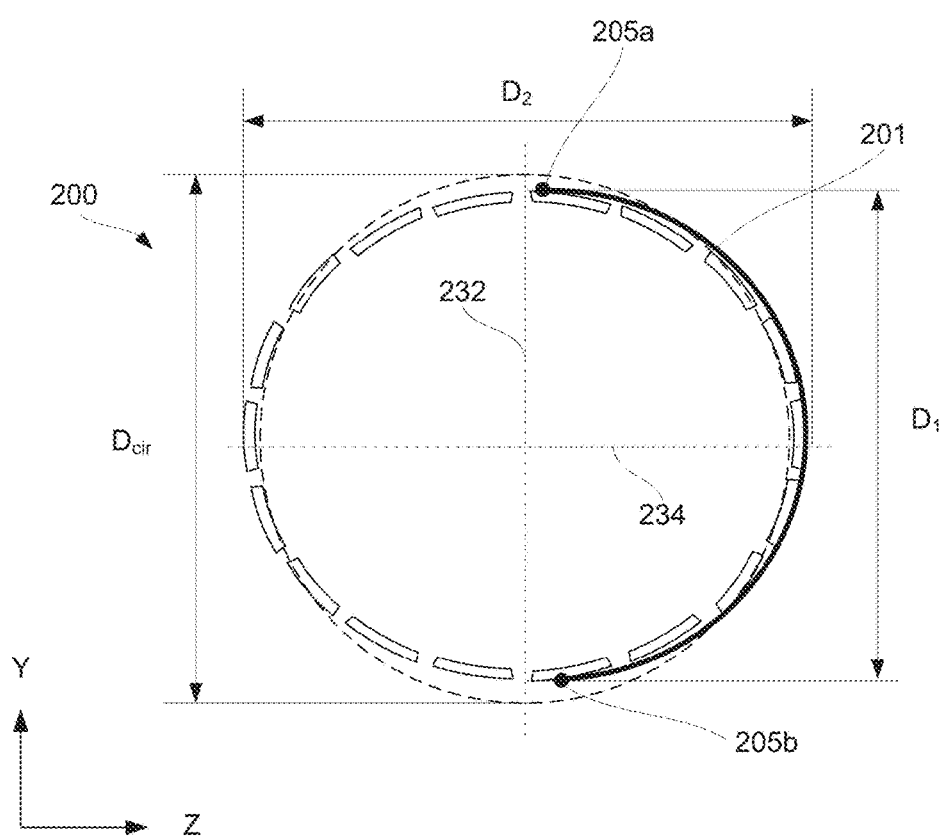

FIG. 2A-2C are schematic representations of the nozzle circumference of a variable area fan nozzle with different petal actuation states, in accordance with some embodiments.

Figure 2D:
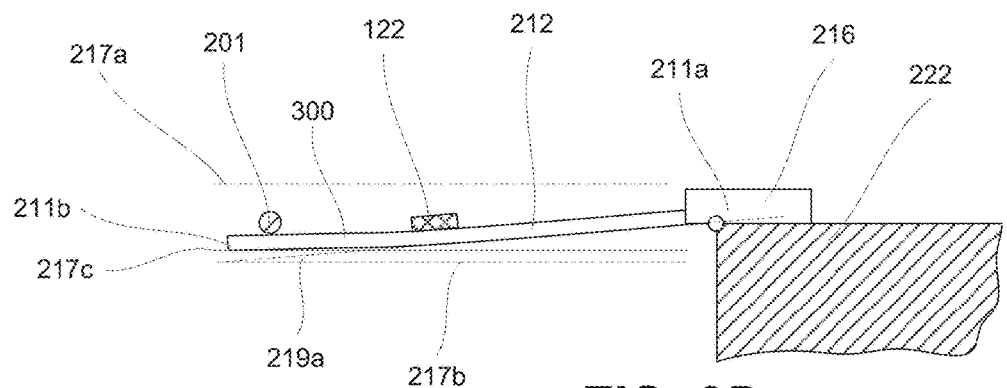
Figure 2E:
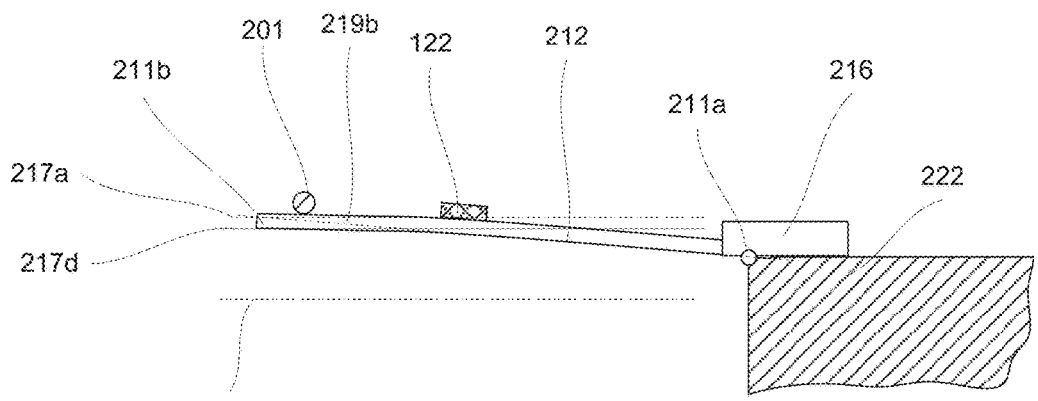

FIG. 2D-2E are schematic representations of a petal at two different actuation states, in accordance with some embodiments.

Figure 3A:
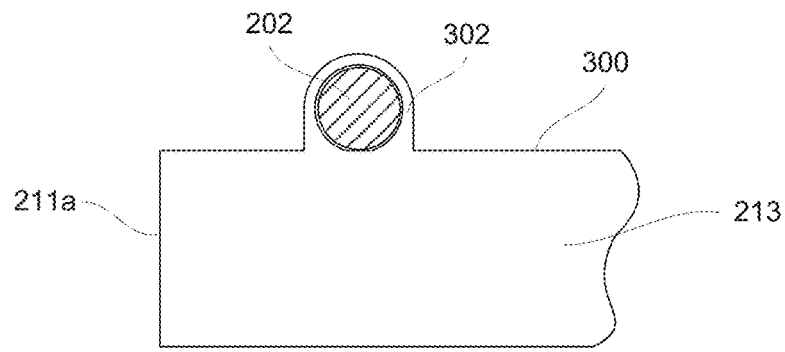
Figure 3B:
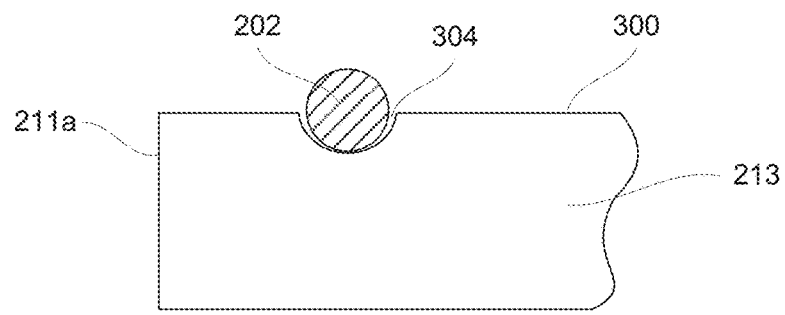
Figure 3C:
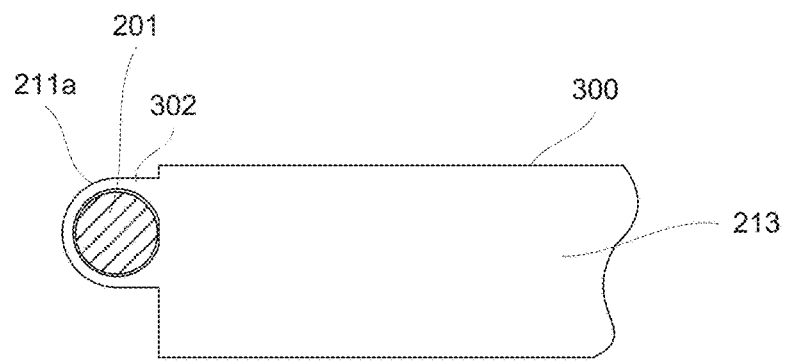

FIG. 3A-3C are schematic representations of different supporting structures used to support a cable with respect to a petal, in accordance with some embodiments.

Figure 3D:
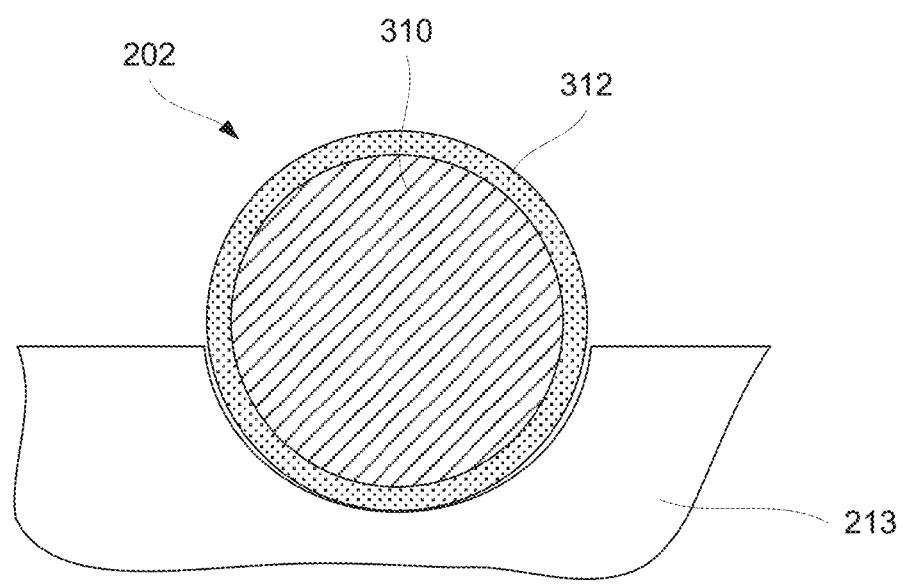

FIG. 3D is a schematic representation a cable having a shell, in accordance with some embodiments.

Figure 4A:
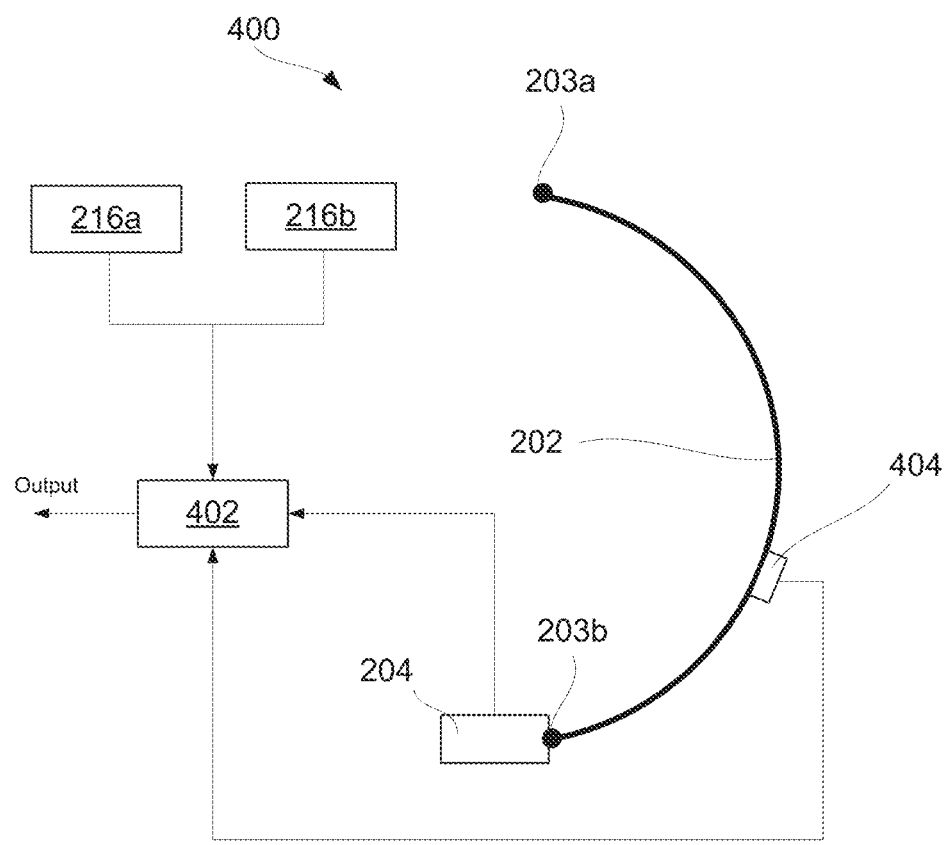

FIG. 4A is a schematic representation of a nozzle area control system including a cable and linear displacement measuring device, in accordance with some embodiments.

Figure 4B:
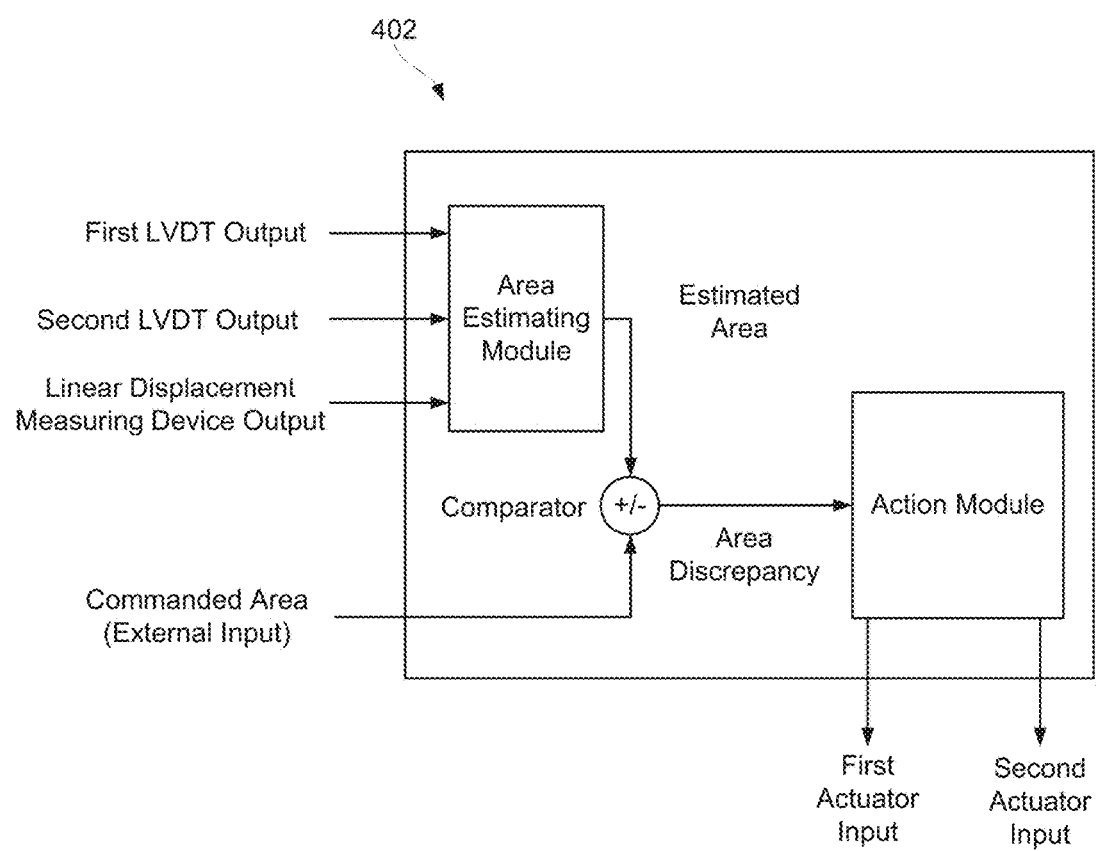

FIG. 4B is a schematic representation of a controller of the nozzle area control system illustrates in FIG. 4A, in accordance with some embodiments.

Figure 5:
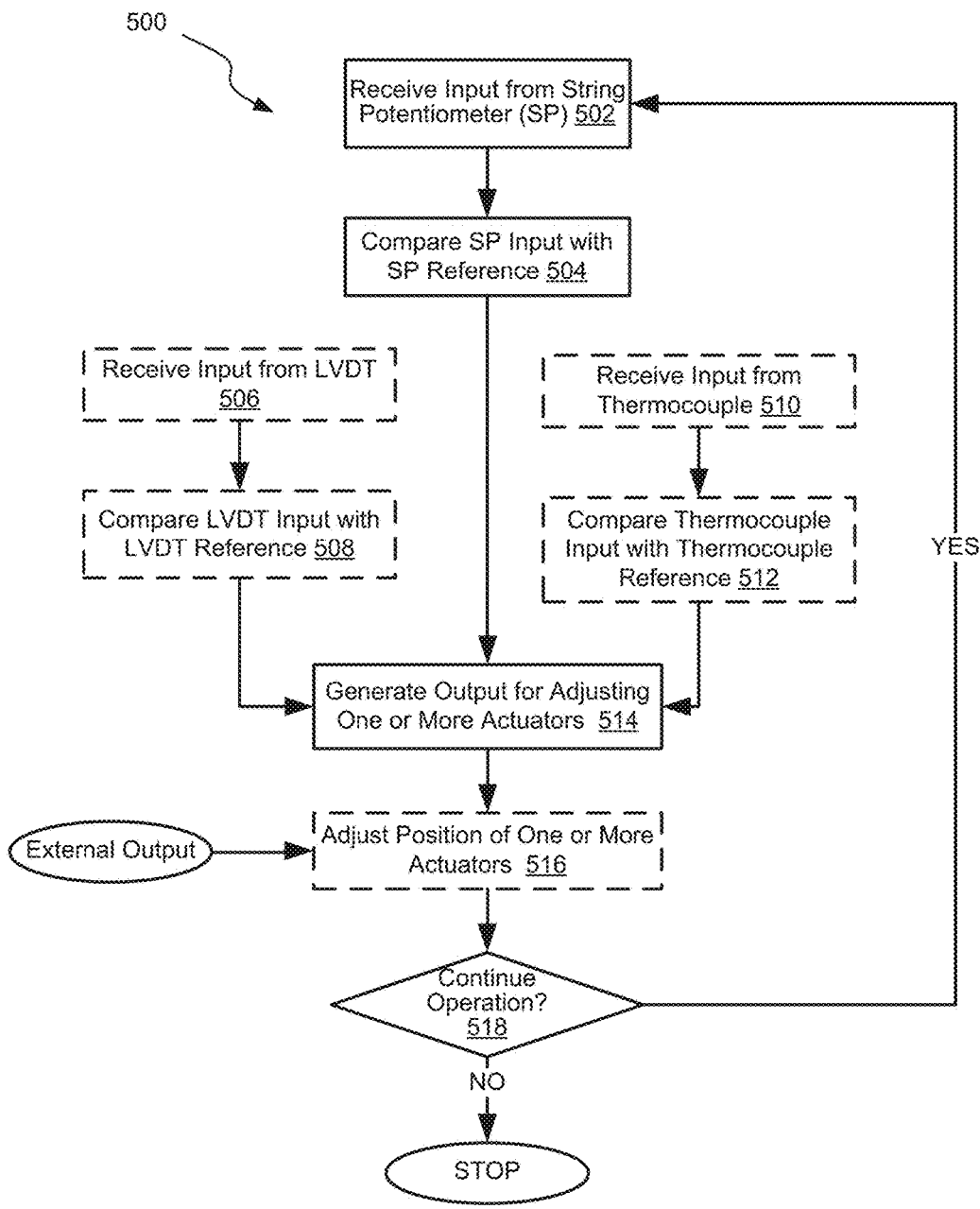

FIG. 5 is a process flowchart corresponding to controlling a nozzle area of a variable area fan nozzle, in accordance with some embodiments.

Figure 6A:
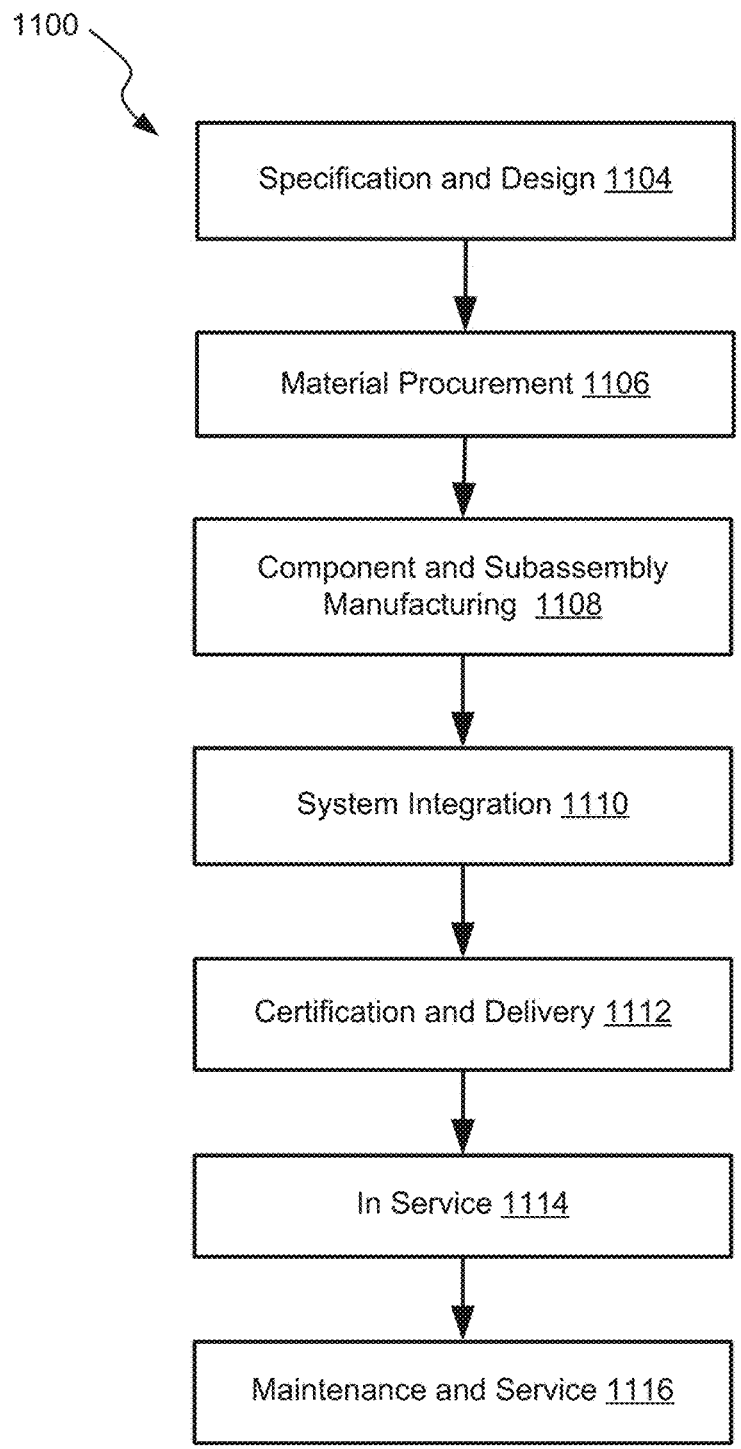

FIG. 6A is a block diagram of an aircraft production and service methodology.

Figure 6B:
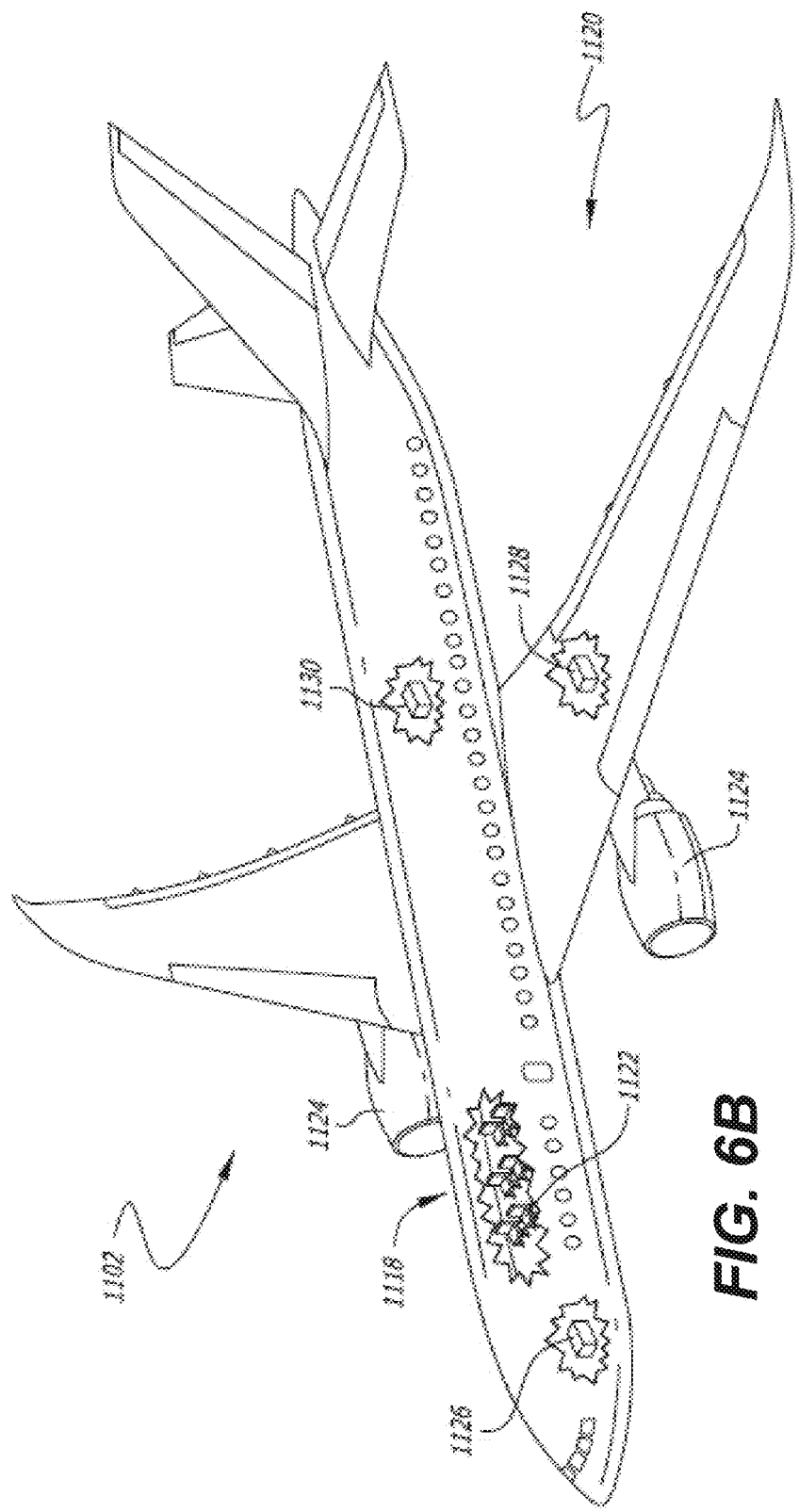

FIG. 6B is a schematic illustration of an aircraft.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.
Introduction A typical turbofan engine used on an aircraft includes a compressor powered by a high pressure turbine and a fan powered by a low pressure turbine. The fan is disposed upstream of the compressor. During operation of this engine, incoming air is pressurized in the compressor and mixed with a fuel in a combustor. The air-fuel mixture is then ignited generating hot combustion gases, which flow downstream through different turbine stages. The combustion gases are discharged through a core nozzle, while the fan air is discharged through a fan nozzle. The fan nozzle is defined at least partially by a nacelle surrounding the core engine and typically has an annular shape. Some propulsion thrust is provided by the pressurized fan air discharged through the fan nozzle, while the remaining thrust is provided from the combustion gases discharged through the core nozzle.

Commercial turbofan engines generally have fixed area fan nozzles optimized for a combination of takeoff, climb, and cruise at an altitude. The goal in selecting a particular area of a fixed area fan nozzle is to reduce combined inefficiencies during different operating regimes. For example, a fixed area fan nozzle designed to have the highest efficiency during the climb is highly inefficient while cruising at an altitude. Likewise, a fixed area fan nozzle designed to have the highest efficiency while cruising at an altitude is highly inefficient during the climb. As such, fixed area fan nozzles sacrifice the maximum performance in each individual operating regime to achieve some combined efficiency.

Changing the area of a fan nozzle may be used to greatly improve the engine performance during each different operating regime. A variable area fan nozzle increases thermodynamic and aerodynamic efficiencies and therefore reducing fuel consumption for an equivalent thrust. Furthermore, a variable area fan nozzle can be used to reduce the noise pollution in the airport area by controlling the fan nozzle flow speed. Finally, a variable area fan nozzle may be used in new engine designs without engine stability issues (e.g., fan flutter).

One major challenge with design and operation of variable area fan nozzles is controlling the nozzle area in a precise manner. Actuator inputs provide very poor feedback of the actual nozzle area as other factors may influence this parameter. Even when actuators are coupled with linear variable differential transducers, the accuracy is not sufficient. Photogrammetry provides more accurate measurements but requires multiple cameras to detect changes of selected points around the nozzle. However, use of this optical technique can be quite difficult during the flight. For example, the cameras may lose their line-of-sight to the nozzle. In some cases, the cameras may not be positioned to observe both portions of the engine nozzle. Furthermore, various maintenance issues can arise depending on the camera locations.

Provided are methods and systems for controlling nozzle areas or, more specifically, for measuring circumference changes on variable area fan nozzles during their operation. These circumference changes are used to estimate the corresponding nozzle areas. A control system installed on a variable area fan nozzle may include a cable connected to a linear displacement measuring device. At least a portion of the cable, which may be referred to as a reference portion, extends across multiple petals. In some embodiments, the reference portion extends substantially parallel to the nozzle circumference. The linear displacement measuring device measures changes in the length of the reference portion of the cable as the petals are being actuated outwardly or inwardly during operation of the fan nozzle. As such, the potentiometer measures changes in the nozzle circumference or, at least, in a part of the circumference. This change is then used to estimate the nozzle area (e.g., based on a calculation or a lookup table stored in a database of the control system). The cable and potentiometer are relatively simple to install, replace, and maintain in comparison, for example, to photogrammetry systems. The cable is positioned right on the petals, which are in accessible locations. Furthermore, this position ensures very accurate representation of the nozzle circumference and provides very precise measurements as further presented below in the experimental results section.

A brief description of a turbofan engine and main components of a nozzle area control system is presented below to provide some context for various features of this system. Specifically, FIG. 1 is a schematic representation of turbofan engine 100 including variable area fan nozzle 200, in accordance with some embodiments. It should be noted that variable area fan nozzle 200 shown in FIG. 1 is only one example of the variable area fan nozzles. One having ordinary skills in the art would understand that the nozzle area control system described herein (e.g., a system including a cable, linear displacement measuring device, and optionally other components) can be used and installed on different types of variable area fan nozzles with different methods of articulation to increase or decrease the nozzle area.

Turbofan engine 100 is shown mounted on engine pylon 102. As noted above, turbofan engine 100 provides thrust from both a core flow and fan flow. The core flow is an exhaust exiting core flow nozzle 130. Core flow nozzle 130 forms a downstream end of the core engine nacelle. The fan flow exits from variable area fan nozzle 200, which may be mounted (e.g., bolted) to the downstream end or lip area of thrust reverser sleeve 140. Thrust reverser sleeve 140 overlaps at least a portion of the core engine nacelle. The core flow generally has a higher velocity than the fan flow.

In some embodiments, variable area fan nozzle 200 includes multiple petals 210 such that free ends 211b of these petals 210 form nozzle circumference 215. Nozzle circumference 215 is associated with the nozzle area as further described below. Petals 210 may be elastically deformable petals or pivotable rigid petals. Specifically, petals 210 are configured to alter the nozzle area in order to change the fan flow passing through the fan duct. For example, petals 210 may be actuated inward or outward using, for example, actuators 118 and 120 connected to flex rod 122. Flex rod 122 may press on petals 210 disposed between actuators 118 and 120. For purposes of this disclosure, free ends 211b may be also referred to as distal ends to distinguish them from proximal ends, which may be also referred to as supported ends 211a.

Petals 210 may be disposed side by side along a trailing lip of thrust reverser sleeve 140. If thrust reverser sleeve 140 is a one-piece axially translatable sleeve, then a single set of petals 210 may extend around a major portion of the circumference of the fan duct, e.g., from one side of engine pylon 102 to the other side of engine pylon 102. In some embodiments, thrust reverser sleeve 140 may include two or more axially translatable partial cowls (e.g., two half-cowls) mounted on rails fixed to upper and lower beams. In these embodiments, each partial cowl may be associated with a separate set of petals 210. Specifically, each set of petals 210 may be attached to a different partial cowl. When multiple sets of petals 210 are used on the same turbofan engine 100, a portion of nozzle circumference 215 associated with each set may be monitored individually using a separate cable and linear displacement measuring device as further described below. Alternatively, a portion or the entire nozzle circumference 215 associated with multiple or all sets may be monitored collectively using the same cable and linear displacement measuring device.

Petals 210 may be pre-stressed such that when petals 210 are not actuated, petals 210 may extend outwardly as further shown in FIGS. 2B and 2E. Alternatively, petals 210 may be actuated outward to form the nozzle circumference shown in FIGS. 2B and 2E. An actuation system including actuators 118 and 120 as well as flex rod 122 may be used to actuate petals 210 inward and/or outward. In some embodiments, petals 210 may have a nominal state when petals 210 are not actuated. The nominal state may correspond to the largest or smallest nozzle circumference depending on the attachment of petals 210. In some embodiments, petals 210 may be moved to both inward and outward actuated states by actuators 118 and 120. In this case, the actuation system may remain activated during operation of the engine to maintain the desired nozzle area.

In the example shown in FIG. 1, variable area fan nozzle 200 includes two sets of petals 210 arranged on opposite sides of engine pylon 102. However, only one set of petals 210 is visible in this view. Adjacent petals 210 in each set may be separated by a gap occupied by elastomeric seal 116. Seals 116 may be made of silicone rubber or other suitable elastomeric material. Seals 116 may be used to prevent leakage of air from inside to outside of variable area fan nozzle 200 through the arrangement of petals 210 and allow petals 210 to move inward and outward with respect to each other. Seals 116 return from a stretched condition to nominal condition during inward actuation of petals 210.

In some embodiments, flex rod 122 is a cable extending between first actuator 118 and second actuator 120. However, flex rod 122 should be distinguished from cable 202 of the nozzle area control system. Flex rod 122 is disposed generally circumferentially and contacting all petals in the respective set. The ends of flex rod 122 are attached to first actuator 118 and second actuator 120, which may include arms mounted to shafts.

Examples of Variable Area Fan Nozzles and Nozzle Area Control Systems

FIG. 1 illustrates a nozzle area control system as a part of variable area fan nozzle 200, in accordance with some embodiments. A standalone example of that system is described below with reference to FIG. 4. Specifically, variable area fan nozzle 200 includes a plurality of petals 210, cable 202, and linear displacement measuring device 204. One example of linear displacement measuring device 204 is a string potentiometer, however other devices capable of measuring a linear displacement of the cable end are also within the scope. Petals 210 include supported petal ends 211a and free petal ends 211b. Supported petal ends 211a may be pivotably coupled to fan duct 202 as, for example, shown in FIGS. 2D and 2E. Free ends 211b form at least a portion of nozzle circumference 215. Nozzle circumference 215 is associated with the nozzle area of variable area fan nozzle 200.

As such, changes in nozzle circumference 215 measured by the nozzle area control system may be used to estimate the nozzle area. It should be noted that variable area fan nozzle 200 may not always have an ideally circular shape. For example, nozzle circumference 215 may be more representative of an oval. Furthermore, two diameters of this oval may change differently when variable area fan nozzle 200 changes between its inward and outward actuated states such that the shape of nozzle circumference 215 in the inward actuated state may be different from the shape in the outward actuated state. These considerations are further described below with reference to FIG. 2C.

Cable 202 of the control system has first end 203a and second end 203b. First end 203a may be attached to first petal 212, while second end 203b may be attached to linear displacement measuring device 204. A portion of cable 202 may extend across petals 210, in some embodiments, substantially parallel to nozzle circumference 215. This portion of the cable may be referred to as reference portion 201. In some embodiments, the entire cable 202 extends across petals 210 substantially parallel to nozzle circumference 215. As such, the entire cable 202 represents reference portion 201. In this case, first end 203a and second end 203b are positioned at the same distance from nozzle circumference 215 and linear displacement measuring device 204 may be positioned on one of petals 210. Alternatively, one of ends 203a and 203b may be positioned closer to nozzle circumference 215 than the other. For example, second end 203b and linear displacement measuring device 204 may be positioned further away from nozzle circumference 215 than first end 203a as, for example, shown in FIG. 1. In other words, the attachment point of linear displacement measuring device 204 may be closer to the fan duct than first end 203a and, more specifically, than reference portion 201. The attachment point of linear displacement measuring device 204 may be on the fan duct or some other fixed component of variable area fan nozzle 200 away from the petals as, for example, shown in FIG. 1. In these embodiments, reference portion 201 is shorter than the entire length of cable 202. In some embodiments, the length of reference portion 201 is at least 90% or even 95% of the entire length of cable 202. It should be noted that a portion of cable 202, which is reference portion 201, may not represent changes in nozzle circumference 215. Using a larger portion of cable 202 as reference portion 201 may provide more accurate measurement. For example, cable 202 may be subjected to thermal fluctuations, mechanical stresses, and other factors that may negatively impact measurement accuracy.

Linear displacement measuring device 204 measures position of second end 203a of cable 202 relative to the attachment point of linear displacement measuring device 204. The position of second end 203a changes relative to the attachment point when the length of reference portion 201 of cable 202 also changes. As such, linear displacement measuring device 204 measures changes in at least a portion of nozzle circumference 215 corresponding to reference portion 201. In some embodiments, reference portion 201 extends at least 90% or even 95% of nozzle circumference 215.

Reference portion 201 of cable 202 may be defined by two reference points, i.e., first reference point 205a and second reference point 205b. These reference points 205a and 205b should be distinguished from first end 203a and second end 203b of cable 202. Specifically, while the length of reference portion 201 (i.e., the length of cable 202 between reference points 205a and 205b), changes as petals 210 go between their inward and outward actuated states, the overall length of cable 202 (i.e., the length between first end 203a and second end 203b) does not change. This difference triggers a response from linear displacement measuring device 204. In some embodiments, one of the reference points may coincide with first end 203a. For example, FIG. 1 illustrates first end 203a coinciding with first reference point 205a. In the same embodiments, the second reference point may coincide with the attachment point of linear displacement measuring device 204. Alternatively, only one reference point may coincide with either first end 203a or the attachment point of linear displacement measuring device 204. For example, FIG. 1 illustrates first end 203a coinciding with first reference point 205a, but the attachment point of linear displacement measuring device 204 does not coincide with second reference point 205b. Furthermore, neither reference point may coincide with first end 203a or the attachment point of linear displacement measuring device 204.

FIGS. 2A-2C are schematic representations of variable area fan nozzle 200 showing various positions of petals 210, in accordance with some embodiments. These schematic representations illustrate variable area fan nozzle 200 in the direction normal to the nozzle area. For simplicity only reference points 205a and 205b and reference portion 201 are shown (rather than the entire cable). Specifically, FIG. 2A illustrates variable area fan nozzle 200 with its petals 210 in their inward actuated states corresponding to nozzle circumference 215 at its minimum. Outer circumference boundary 217a corresponding to nozzle circumference 215 when petals 210 are in their outward actuated states is shown in FIG. 2A for reference. As noted above, the nominal (unactuated) state may correspond to either inward actuated state, outward actuated state, or somewhere in between the inward actuated state and outward actuated state.

In the example shown in FIG. 2A, variable area fan nozzle 200 includes first variable area fan nozzle portion 207a and second variable area fan nozzle portion 207b separated by first center line 232. Each of first variable area fan nozzle portion 207a and second variable area fan nozzle portion 207b may be actuated and controlled separately. In general, variable area fan nozzle 200 may have any number of such portions, e.g., one, two, three, four, and so on. For simplicity, only actuators and components of nozzle area control system corresponding to first variable area fan nozzle portion 207a are shown in FIG. 2A. One having ordinary skills in the art would understand that similar components may be also used for second variable area fan nozzle portion 207b. Actuators and nozzle area control systems of different portions of the same variable area fan nozzle are generally synchronized.

FIG. 2A illustrates first reference point 205a positioned on first petal 212 and second reference point 205b positioned on second petal 214. In this example, first petal 212 is the closest petal among petals 210 to first actuator 118, while second petal 214 is the closest petal among petals 210 to second actuator 120. Because of their proximity of the actuators, first petal 212 and second petal 214 may be also referred to as end petals in the set of petals 210. Positioning reference points on the end petals may give more accurate representation of the nozzle circumference portion represented by this set of petals than, for example, when one or both reference points are positioned on other intermediate petals. For example, FIG. 2A illustrates intermediate petal 213 disposed between first petal 212 and second petal 214 along the nozzle circumference. It should be noted that any intermediate petals positioned between petals corresponding to reference points may be in contact with reference portion 201. In the example presented in FIG. 2A, there are seven intermediate petals disposed between first petal 212 and second petal 214 (collectively referred to as petals 210) and each of these seven intermediate petals contacts reference portion 201. However, one having ordinary skills in the art would understand that any number of intermediate petals may be used, e.g., zero, one, two, and so on.

FIG. 2B illustrates variable area fan nozzle 200 with its petals 210 in the outward actuated state corresponding to nozzle circumference 215 at its maximum. Inner circumference boundary 217b corresponding to nozzle circumference 215 when petals 210 are in their outward actuated state is shown in this figure for reference. Inner circumference boundary 217b corresponds to nozzle circumference 215 shown in FIG. 2A described above. The distance between reference points 205a and 205b is smaller when petals 210 are actuated inward (as shown in FIG. 2A) than when petals 210 are actuated outward (as shown in FIG. 2B). As such, reference portion 201 in the inward actuated state will be shorter triggering a corresponding response from a linear displacement measuring device, such as a string potentiometer. In the example shown in FIGS. 2A and 2B, reference portion 201 represents almost a half of nozzle circumference 215. However, one having ordinary skills in the art would understand that this approach may be applied to other designs as well.

FIGS. 2A and 2B show transition of petals 210 between inward actuated and outward actuated states both of which correspond to circular nozzle circumference 215. In some embodiments, the shape in one or both states may be different than circular, which may influence a different response from a linear displacement measuring device, such as a string potentiometer. For example, FIG. 2C illustrates variable area fan nozzle 200 with its petals in one of the inward or outward actuated state, in accordance with some embodiments. However, nozzle circumference 215 of this variable area fan nozzle 200 is oval such that its diameter ($D_1$) along first centerline 232 is smaller than its diameter ($D_2$) along second centerline 234. One having ordinary skills in the art would understand that the perimeter and area of an oval have a different relationship than that of a circle. Specifically, the ratio of the area to circumference is smaller for an oval than for a circle. The proposed method and systems may be also used for nozzle area estimation capability when actuators operate asymmetrically. For example one actuator may be extended outward to its maximum, while another actuator may be extended inward to its maximum.

Additional difficulty may appear when nozzle circumference 215 changes not only its size but also its shape when petals 210 transition between the inward and outward actuated states. When these changes are consistent, the change in length of reference portion 201 may be still correlated to the nozzle area, for example, by gathering data and generating a look-up table. However, when the changes are not consistent some additional parameters may be used for the estimate. For example, linear variable differential transducers 216a and 216b may be used to measure an angle of a petal as the petal moves between the inward and outward actuated states. One such example is shown in FIGS. 2D and 2E. In some embodiments, each of linear variable differential transducers 216a and 216b may be coupled to a separate actuator, which may not be a part of control system 400.

Specifically, FIG. 2D is a schematic representation of first petal 212 actuated inward. Free end 211b of this petal 212 defines actual inward circumference boundary 217c. Supported end 211a of first petal 212 is pivotably connected to fan duct 222. Other coupling methods may be used as well. For example, first petal 212 may be sufficiently flexible such that supported end 211a may be rigidly connected to duct 222. Reference cable portion 201 and flex rod 122 are shown for reference.

Linear variable differential transducer 216 or, more generally, a linear feedback device or, even more generally, a position sensor (e.g., a rotary variable differential transducer (RVDT)) may be positioned at the interface between supported end 211a and duct 222. Linear variable differential transducer or any other type of sensors may be used to measure the angle first petal 212 establishes/makes with respect to fan duct 222 or some other parameter representative of this angle. Alternatively, a linear variable differential transducer may be coupled to first actuator 118 in order, for example, to measure the position of first actuator 118.

It should be noted that FIG. 2D illustrates first petal 212 being bent and deviating from its inward straight profile 219a shown with the dashed line. This bending may be caused by aerodynamic or thrust forces. While this bending changes the inner circumference boundary, it cannot be detected by linear variable differential transducer 216. Specifically, linear variable differential transducer 216 will give the same reading for bent first petal 212 as shown in FIG. 2D and for a straight first petal represented by inward straight profile 219a. However, bent first petal 212 will have a larger actual inward circumference boundary 217c than inner circumference boundary 217b corresponding to inward straight profile 219a. As such, cable 202 is used to determine, or directly or indirectly measure, inner circumference boundary 217c.

When two linear variable differential transducers or other like sensors are positioned opposite to each other on the circumference boundary (e.g., connected to first actuator 118 and second actuator 120 as shown in FIG. 2A), the responses from these sensors are used to estimate the diameter of the circumference in the direction between the two sensors. This information may be coupled with the changes in length of the cable extending around at least a portion of this circumference to determine the diameter, which may be different from the first diameter if the circumference has an oval shape as, for example, shown in FIG. 2C. The two diameters can be used to more precisely estimate the area of the circumference than possible with any one of these sensors individually.

Regardless of the position and measuring parameters of linear variable differential transducer 216, its output as well as the output of linear displacement measuring device 204 may be collectively used for the controlling nozzle area as further described below with reference to FIGS. 4 and 5. FIG. 2E is a schematic representation of first petal 212 in its outward actuated state. Again, first petal 212 is shown being bent and deviating from its outward straight profile 219b shown with the dashed line. This bending may be caused by aerodynamic or thrust forces. Outward straight profile 219b defines outer circumference boundary 217a while bent first petal 212 may have a different actual outward circumference boundary 217d. In general, actual outward circumference boundary 217d may be smaller or larger than outer circumference boundary 217a depending on the relative magnitudes of thrust and aerodynamic forces.

FIGS. 2D and 2E illustrate reference portion 201 being positioned between free end 211b and supported end 211a. Positioning this portion of the cable closer to free end 211b may result in a more accurate estimate of the nozzle area. In some embodiments, reference portion 201 extends closer to free petal ends 211b than to supported petal ends 211a. More specifically, reference portion 201 extends at free petal ends 211b as, for example, shown in FIG. 3C and further described below. In this case, reference portion 201 may provide an exact representation of the nozzle circumference. In some embodiments, portion of cable 202 extending across plurality of petals 210 extends over external surface 300 of plurality of petals 210.

In order for reference portion 201 to accurately represent the surface of petals 210, reference portion 201 needs to maintain a consistent position on this surface. Various channels, sleeves, grooves, conduits, loops, brackets, and other features, such as retention or positioning features, may be used to support reference portion 201 with respect to the surface. For example, FIG. 3A is a schematic illustration of sleeve 302 supported on external surface 300 of intermediate petal 213. Cable 202 slidably protrudes through this sleeve 302 but otherwise is supported by sleeve 302. Specifically, sleeve 302 maintains a consistent, or constant, position of cable 202 with respect to free petal end 211a and respect to external surface 300. In some embodiments, each petal positioned along reference portion 210 has a similar sleeve. Alternatively, only one or more petals have sleeves while other channels may not have any retaining features or may have different retaining features, e.g., channels. FIG. 3C illustrates an example in which sleeve 302 is positioned on free petal end 211a rather than on external surface 300.

FIG. 3B is a schematic illustration of channel 304 supported on external surface 300 of intermediate petal 213. Cable 202 slidably protrudes along this channel 304, which maintains constant position of cable 202 with respect to free petal end 211a and external surface 300. In some embodiments, each petal positioned along reference portion 210 has a similar channel.

In some embodiments, cable 202 may include polymer shell 312 as, for example, shown in FIG. 3D. Specifically, cable 202 may have core 310 made from a metal, e.g., steel. Core 310 may provide mechanical strength to cable 202 such that cable 202 does not stretch or otherwise deform during operation of variable area fan nozzle 200. Core 310 may be enclosed within shell 312, which may be made from one or more polymer materials. Shell 312 may protect core 310 from the environment. Furthermore, shell 312 may be used to reduce friction between cable 202 and petals 210.

FIG. 4A is a schematic representation of nozzle area control system 400 including cable 202 and linear displacement measuring device 204, in accordance with some embodiments. Nozzle area control system 400 may be provided as a standalone system, which is later installed on turbofan engine 100. In some embodiments, individual components of nozzle area control system 400 form this system when installed on turbofan engine 100. In addition to cable 202 and linear displacement measuring device 204, nozzle area control system 400 may include controller 402, which may be used to receive inputs from linear displacement measuring device 204 and combine this input with other inputs. For example, controller 402 may combine this input with an input from one or more linear variable differential transducers 216a and 216b, which may be also a part of system 400, or alternatively, a part of a different turbofan controller system. Operation of linear variable differential transducers 216a and 216b is described above with reference to FIGS. 2D and 2E. In some embodiments, controller 402 may combine potentiometer's input with an input from thermocouple 404, which may be thermally coupled to cable 202 or, more specifically, to reference portion 201. For example, the input from thermocouple 404 may be used to adjust the input from linear displacement measuring device 204 based the temperature changes of cable 202 and to account any variations associated with a coefficient of thermal expansion of cable 202. Based on these various inputs, controller 402 may produce an output that may be used to adjust the position of one or more actuators of variable area fan nozzle 200 as further described below with reference to FIGS. 4B and 5.

Specifically, FIG. 4B is a schematic representation of controller 402 of nozzle area control system 400 shown in FIG. 4A, in accordance with some embodiments. Controller 402 may include an area estimating module, comparator, and action module. The area estimating module may receive outputs of one or more LVDTs and from a linear displacement measuring device, for example. For example, the area estimating module may use an empirically derived quadratic regression model of the nozzle area as a function of the sensor outputs. Alternatively, the area estimating module may use a model-based estimator, Kalman filter, priori table look-up, and other like algorithms. Based on these outputs, the area estimating module may estimate the current area of the nozzle, which is then compared with an external input. The external input may contain a currently desired area of the nozzle. Depending on the discrepancy between the estimated and desired areas of the nozzle, the action module may generate instructions to one or more actuators that are provided as inputs to these actuators. Overall, controller 402 may perform a set of operations in each cycle and repeat this cycle continuously during operation of the engine. Specifically, the cycle may include providing all sensor outputs into the area estimating module, calculating the current time-step area estimate, subtracting the area estimate from the desired (commanded) area to create an error signal, applying control laws to the error signal to determine new actuator commands, sending the new commands to the actuators as actuators inputs. In some embodiments, this cycle may be repeated continuously and quickly (e.g., 50 Hz). Controller 402 may not wait for the actuators to finish moving before it changes the command. In other words, controller 402 continuously recalculates the estimated area and keeps changing the actuator commands as it gets closer to the desired area.

Examples of Controlling Nozzle Areas of Variable Area Fan Nozzles

FIG. 5 is a process flowchart corresponding to method 500 of controlling the nozzle area of a variable area fan nozzle, in accordance with some embodiments. Various examples of variable area fan nozzles are described above. Method 500 may commence with receiving a first input from a linear displacement measuring device during operation 502. As described above, the linear displacement measuring device may be connected to a second end of a cable. The first input depends on the position of the second end of the cable relative to the attachment point of the linear displacement measuring device. The first end of this cable may be connected to a first petal. A portion of the cable extends across the petals substantially parallel to the nozzle circumference of the variable area fan nozzle. As described above, this portion is referred to as a reference portion. The length of this portion changes as the petals of the variable area fan nozzle go between their inward and outward actuated states. The input from the linear displacement measuring device represents the length of this reference portion and, as a result, the state of the variable area fan nozzle.

Method 500 may proceed with comparing the first input from the linear displacement measuring device to a first reference value during operation 504. For example, the first reference value may correspond to potentiometer's output when the petals in the outward actuated state or when the petals in the inward actuated state. In some embodiments, the first reference value is selected from one or more reference values corresponding to different states of the petals. The selected value may correspond to the desired petal state.

Based on comparing the first input to the first reference value during operation 504, a first output may be generated during operation 514. This output may be used to control one or more actuators of the variable area fan nozzle. For example, when comparing the first input to the first reference indicates that the petals are not sufficiently actuated, the first output may instruct the actuators to continue the actuation. Operations 504 and 514 may involve using a look-up database of the control system. Specifically, the first input may be compared with the first reference value appearing in this database for a desired actuation state of the variable area fan nozzle and, depending on this comparison, a first output may be selected from the database.

In some embodiments, method 500 also involves receiving one or more additional inputs as shown by optional operation 506 and 510 and/or repeating operation 502. For example, a second input from a linear variable differential transducer during optional operation 506. As described above, the linear variable differential transducer may measure the position of the one or more actuators and/or an angle of a petal relative to the fixed support. The second input may be compared to a second reference value during optional operation 508. Operation 514 may also take into account this additional comparison. More specifically, the first output is generated during operation 514 based on comparing the first input to the first reference value and based on comparing the second input to the second reference value. As such, multiple conditions may be used in generating the first output.

In some embodiments, method 500 involves receiving a fourth input from a thermocouple during optional operation 510. Various examples of thermocouples and their connections to the cable are described above with reference to FIG. 4. Method 500 may proceed with comparing this fourth input to a fourth reference value during operation during optional operation 512. In this case, the first output is generated based on comparing the first input to the first reference value and comparing the fourth input to the fourth reference value. In some embodiments, the first output is generated based on comparing of all three inputs to their respective reference values.

In some embodiments, method 500 also involves adjusting actuators' position based on the first output during optional operation 516. For example, the output may indicate that the petals need to be actuated more inward or outward. The output may be communicated to the actuators to adjust their positions.

After adjusting actuator's position during operation 516, at least operations 502, 504, and 514 may be repeated one or more times. In some embodiments, additional operations may be repeated as well. For example, method 500 may proceed with receiving an additional input (e.g., a third input) from the linear displacement measuring device while repeating operation 502 and using this input to determine additional output. In this case, the third input may be used similar to the first input described above. Specifically, the third input may be compared to its reference and another output may be generated based on this comparison.

Experimental Results

A set of experiments was conducted to determine accuracy of various techniques used to estimate the nozzle area. The experiments involved different test conditions: two actuation rates (i.e., 1% of the nominal area per second v. 0.33% per second and subjecting petals to different loads (0 lbs load v. 500 lbs load, externally applied at the center of the petals directed outward from the engine centerline). Four different techniques have been studied: (1) a linear variable differential transducer (LVDT) mounted to the actuators only; (2) a combination of the linear variable differential transducer with a radial sensor measuring the petals; (3) a combination of the linear variable differential transducer with a circumferential measurement system using a cable and linear displacement measuring device; (4) a combination of the linear variable differential transducer with the radial sensor and the circumferential measurement system using a cable and linear displacement measuring device. The radial measurement involved a linear displacement measuring device attached at a stationary component with a cable attached to near the center of the petal. The radial measurement effectively measured a pseudo angle of rotation of the petal with respect to the stationary component. The measurements were compared with photogrammetry results (used as base value) to determine measurement errors associated with each technique. The results showing average errors for each technique at different test conditions are summarized in the table below.

TABLE 1

| Conditions/Techniques | LVDT | LVDT + Radial | LVDT + Circumferential | LVDT + Radial + Circumferential |
|---|---|---|---|---|
| 1% per second; 0 lbs | 1.54% | 0.91% | 0.54% | 0.53% |
| 0.33% per second; 0 lbs | 1.26% | 0.48% | 0.26% | 0.27% |
| 1% per second; 500 lbs | 1.17% | 0.77% | 0.61% | 0.62% |
| 0.33% per second; 500 lbs | 1.20% | 0.50% | 0.26% | 0.27% |

As it can be clearly seen from the experimental results, adding the circumferential technique to LVDT produced the most improvement in accuracy measurement. Further adding the radial technique did not yield additional improvement. The circumferential technique by itself may not be sufficient to estimate the nozzle area when, for example, the nozzle area also changes its shape (as described above). Combining the circumference technique with the actuation input (e.g., using an LVDT technique) provided more data that in some instances may be sufficient to characterize the shape of the area and to determine the area more precisely. In the test example combining the LVDT and radial techniques, the LVDT provided data about position of the actuator. This position directly influences how far the petals rotate about their attachment points (e.g., hinges). The radial measurement provided a pseudo rotation angle. These two measurements are too similar to each other and less complimentary than, for example, data received from a combination of the LVDT and circumferential techniques.

A simple example may help to better understand a synergy of LVDT and circumferential techniques and deficiencies of other combinations (e.g., that do not rely on a circumferential technique). In this example, a two dimensional polygon surface extends and is measured within an X-Y plane. One sensor can work along the X-Axis, while the other sensor can work along a line positioned at a 45 degree angle to the X and Y axes. When the measurement is performed along two non-orthogonal axes, the measurement is less accurate than when measurement is performed along two orthogonal axes.

Examples of Aircraft Application

Examples of this disclosure may be described in the context of an aircraft manufacturing and service method 1100 as shown in FIG. 6A and aircraft 1102 as shown in FIG. 6B. During pre-production, illustrative method 1100 may include specification and design 1104 of the aircraft 1102 and material procurement 1106. During production, component and subassembly manufacturing 1108 and system integration 1110 of aircraft 1102 take place. Thereafter, aircraft 1102 may go through certification and delivery 1112 to be placed in service 1114. While in service by a customer, aircraft 1102 is scheduled for routine maintenance and service 1116 (which may also include modification, reconfiguration, refurbishment, and so on). A system for controlling a nozzle area of the variable area fan nozzle may be added at any one of these stages. For example, the system may be added during manufacturing 1108 or system integration 1110. In some embodiments, the system may be added while aircraft 1102 is in service.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6B, aircraft 1102 produced may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc. A system for of controlling a nozzle area of the variable area fan nozzle may be a part of propulsion system 1124 and/or electrical system 1126.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. A variable area fan nozzle comprising:
   a plurality of petals comprising supported petal ends and free petal ends,
      wherein the supported petal ends are pivotably coupled to a fan duct,
      wherein the free petal ends form at least a reference portion of a nozzle circumference, and
      wherein the nozzle circumference is associated with a nozzle area of the variable area fan nozzle;
   a cable comprising a first end and a second end,
      wherein a reference portion of the cable extends across the plurality of petals substantially parallel to the nozzle circumference, and
      wherein the reference portion of the cable extending across the plurality of petals extends closer to the free petal ends than to the supported petal ends; and a linear displacement measuring device connected to the second end of the cable and measuring a position of the second end of the cable relative to an attachment point of the linear displacement measuring device.

2. The variable area fan nozzle of claim 1, wherein the first end of the cable is connected to a first petal of the plurality of petals.

3. The variable area fan nozzle of claim 2, wherein the attachment point of the linear displacement measuring device is a second petal of the plurality of petals, wherein the second petal is different from the first petal.

4. The variable area fan nozzle of claim 1, wherein the attachment point of the linear displacement measuring device is closer to the fan duct than the reference portion of the cable extending across the plurality of petals substantially parallel to the nozzle circumference.

5. The variable area fan nozzle of claim 1, wherein the reference portion of the cable extends across the plurality of petals at the free petal ends.

6. The variable area fan nozzle of claim 1, wherein the reference portion of the cable extending across the plurality of petals extends over an external surface of the plurality of petals.

7. The variable area fan nozzle of claim 1, wherein the reference portion of the cable extending across the plurality of petals extends within a sleeve attached to at least one of the plurality of petals.

8. The variable area fan nozzle of claim 1, wherein the reference portion of the cable extending across the plurality of petals extends within a channel in at least one of the plurality of petals.

9. The variable area fan nozzle of claim 1, wherein the cable comprises a polymer shell.

10. The variable area fan nozzle of claim 1, wherein the plurality of petals is disposed between a first actuator and a second actuator, and wherein the first actuator and the second actuator are connected to a flex rod contacting each of the plurality of petals for pivoting the plurality of petals relative to the fan duct.

11. The variable area fan nozzle of claim 10, wherein the first end of the cable is connected to a first petal of the plurality of petals, and wherein the first petal is closest to the first actuator among the plurality of the petals.

12. The variable area fan nozzle of claim 11, wherein the attachment point of the linear displacement measuring device is on a second petal, and wherein the second petal is closest to the second actuator among the plurality of the petals.

13. The variable area fan nozzle of claim 10, wherein the first actuator is coupled to a linear variable differential transducer measuring a position of the first actuator, and wherein an output of the linear variable differential transducer and an output of the linear displacement measuring device are used for controlling the nozzle area.

14. The variable area fan nozzle of claim 1, further comprising a linear variable differential transducer measuring an angle of one of the plurality of the petals with respect to the fan duct.

15. A variable area fan nozzle comprising:
a plurality of petals comprising supported petal ends and free petal end,
wherein the supported petal ends are pivotably coupled to a fan duct,
wherein the free petal ends form at least a reference portion of a nozzle circumference, and
wherein the nozzle circumference is associated with a nozzle area of the variable area fan nozzle;
a cable comprising a first end and a second end,
wherein a reference portion of the cable extends across the plurality of petals substantially parallel to the nozzle circumference, and
wherein the reference portion of the cable extends across the plurality of petals at the free petal ends; and
a linear displacement measuring device connected to the second end of the cable and measuring a position of the second end of the cable relative to an attachment point of the linear displacement measuring device.

16. The variable area fan nozzle of claim 15, wherein the first end of the cable is connected to a first petal of the plurality of petals.

17. The variable area fan nozzle of claim 16, wherein the attachment point of the linear displacement measuring device is a second petal of the plurality of petals, wherein the second petal is different from the first petal.

18. A variable area fan nozzle comprising:
a plurality of petals comprising supported petal ends and free petal ends,
wherein the supported petal ends are pivotably coupled to a fan duct,
wherein the free petal ends form at least a reference portion of a nozzle circumference, and
wherein the nozzle circumference is associated with a nozzle area of the variable area fan nozzle;
a cable comprising a first end and a second end,
wherein a reference portion of the cable extends across the plurality of petals substantially parallel to the nozzle circumference, and
wherein the reference portion of the cable extending across the plurality of petals extends over an external surface of the plurality of petals; and
a linear displacement measuring device connected to the second end of the cable and measuring a position of the second end of the cable relative to an attachment point of the linear displacement measuring device.

19. The variable area fan nozzle of claim 18, wherein the first end of the cable is connected to a first petal of the plurality of petals.

20. The variable area fan nozzle of claim 19, wherein the attachment point of the linear displacement measuring device is a second petal of the plurality of petals, wherein the second petal is different from the first petal.

* * * * *